United States Patent
Bannister

[15] 3,664,998

[45] May 23, 1972

[54] PROCESS FOR CONVERTING PERACYLATED CIS-GLYCOSY HALIDES TO PERACYLATED TRANS-GLYCOSYL HALIDES AND NOVEL COMPOUNDS

[72] Inventor: Brian Bannister, Kalamazoo, Mich.

[73] Assignee: The Upjohn Company, Kalamazoo, Mich.

[22] Filed: Nov. 3, 1969

[21] Appl. No.: 873,715

[52] U.S. Cl. ..........................260/210 R, 260/9, 424/180
[51] Int. Cl. ...........................................................C07c 47/18
[58] Field of Search ..............................................260/210 R

[56] References Cited

UNITED STATES PATENTS 3,300,475  1/1967  Bannister............................260/210 R
3,366,624  1/1968  Argoudelis et al. ................260/210 R

OTHER PUBLICATIONS

" Chem. Abst.," Vol. 58, 1963 p. 6906 (a) & (b)

Primary Examiner—Lewis Gotts
Assistant Examiner—Johnnie R. Brown
Attorney—John Kekich and George T. Johannesen

[57] ABSTRACT

A peracylated cis-glycosyl halide is converted to the corresponding isothiouronium halide. The latter is decomposed to the corresponding mercaptan ($\beta$-anomer) which is concomitantly alkylated to the corresponding 1-thioglycoside. The latter is then converted to the trans-glycosyl halide by the reaction of halogen in an inert solvent. 6-Acylamino-6-deoxy-2,3,4-tri-0-acyl-$\alpha$-D-galactopyranosyl bromide is in this way converted to the $\beta$-anomer.

The $\beta$-anomer is then converted to the 1-thio-$\alpha$-glycoside by the thiourea process using a tertiary base dipolar aprotic solvent, the resulting 1-thio-$\alpha$-glycoside deacylated, and the amino group reacylated to form antibacterially active 7,8-bisnorlincomycin or analog thereof.

22 Claims, No Drawings

PROCESS FOR CONVERTING PERACYLATED CIS-GLYCOSY HALIDES TO PERACYLATED TRANS-GLYCOSYL HALIDES AND NOVEL COMPOUNDS

BRIEF DESCRIPTION OF THE INVENTION

This invention relates to a process for converting peracylated cis-glycosyl halides to peracylated trans-glycosyl halides and to novel compounds.

It is known that peracylated cis-glycosyl halides, that is to say, peracylated glycosyl halides in which the C-2 acyloxy group and the 1-halo group are in the cis-position, have properties which differ materially from the corresponding peracylated trans-glycosyl halides. This difference in properties is ascribed to the inner action of the acetoxy group at C-2 position with the C-1 position, which phenomenon is possible in the peracylated trans-glycosyl halides but not possible in the peracylated cis-glycosyl halides. Staneck et al. The Monosaccharides, Publishing House of the Czeckoslovak Academy of Sciences, Prague, 1963, page 201.

Various methods have been described heretofore for converting peracylated cis-glycosyl halides to peracylated trans-glycosyl halides, but the processes lack versatility, that is, are not always generally applicable to particular peracylated cis-glycosyl halides and when applicable give poor conversion.

In accordance with the present invention it has now been discovered that a peracylated cis-glycosyl halide can easily and effectively be converted to a peracylated trans-glycosyl halide by first converting the peracylated cis-glycosyl halide to a peracylated alkyl trans-1-thioglycoside and then reacting the peracylated alkyl 1-thioglycoside with bromine in a non-aqueous solution to form the desired peracylated trans-glycosyl halide.

The conversion of the peracylated cis-glycosyl halide to the corresponding peracylated alkyl trans-1-thioglycoside can be effected by processes already known in the art. A suitable method is to react the peracylated cis glycosyl halide with potassium xanthate and subsequent treatment with ammonia to form a peracylated trans-glycosyl mercaptan (trans-1-thioglycose), and alkylating this product, with a suitable alkylating agent, for example, alkyl halide, to form the corresponding peracylated alkyl trans-1-thioglycoside.

Alternatively, the peracylated trans-glycosyl mercaptan can be prepared by converting the peracylated cis-glycosyl halide to the corresponding disulfide by the action of potassium sulfide and reductive cleavage of the latter either by aluminum amalgam or zinc.

A still more effective method of producing the peracylated trans-glycosyl mercaptan is to react the peracylated cis-glycosyl halide with thiourea in an inert solvent, for example, toluene, isopropyl alcohol, or acetone to form the corresponding isothiouronium slat and decomposing this salt by means of acid sodium carbonate.

A particularly desirable method of producing the desired peracylated alkyl trans-1-thioglycoside is to react the peracylated cis-glycosyl halide with thiourea in acetone, advantageously with gentle reflux, and then treating the reaction mixture with an acid carbonate, preferably a mixture of potassium or sodium carbonate and potassium or sodium bicarbonate, water, and methyl iodide. The desired product is then isolated from the reaction mixture by procedures already well known in the art.

The peracylated glycosyl halides produced by the process of the invention are for the most part known in the art and are useful as glycosylating agents. Thus they can be used for making nucleosides, glycosides and thioglycosides.

A particular application of the process of the invention is the conversion of peracylated 6-amino-6-deoxy-α-D-galacto-pyranosyl bromide to peracylated 6-amino-6-deoxy-β-D-galacto-pyranosyl bromide (6-acetamido 6-deoxy 2,3,4-tri-O-acetyl-β-D-galactopyranosyl bromide) which is a desired starting material for preparation of 7,8-bisnorlincomycin [methyl 6-deoxy-6(1-methyl-trans-4-propyl-L-2-pyrrolidinecarboxamido)-1-thio-α-D-galactopyranoside] and analogs thereof. This is accomplished by converting peracylated 6-amino-6-deoxy-α-D-galacto-pyranosyl bromide to peracylated R 6-amino-6-deoxy-1-thio-β-D-galactopyranoside, where R is a lower alkyl group, a benzyl group, or other aglycone moiety, brominating the latter to form peracylated 6-amino-6-deoxy-β-D-galactopyranosyl bromide, converting the latter to peracylated 6-amino-6-deoxy-1-thio-α-D-galactopyranoside, deacylating the latter to form 6-amino-6-deoxy-1-thio-α-D-galactopyranoside, and acylating the latter with an L-2-pyrrolidinecarboxylic acid. When the aglycone moiety R is methyl and the L-2-pyrrolidinecarboxylic acid is trans-1-methyl-4-propyl-L-2-pyrrolidinecarboxylic acid the compound is 7,8-bisnorlincomycin which though not as active as lincomycin has antibacterial activity against such organisms as *Staphylococcus aureus*, *Streptococcus hemolyticus*, *Streptococcus faecalis*, and *Bacillus subtilis*.

The R 6-amino-6-deoxy-1-thio-α-D-galactopyranoside, as well as the acylates thereof with an L-2-pyrrolidinecarboxylic acid can exist either in the free base form or in the form of an acid addition salt. These acid addition salts can be made by neutralizing the free base with the appropriate acid to below about pH 7.0, and advantageously to about pH 2 to pH 6. Suitable acids for this purpose include hydrochloric, sulfuric, phoshoric, thiocyanic, fluosilicic, hexafluoroarsenic, hexafluorophosphoric, acetic, succinic, citric, lactic, maleic, fumaric, pamioc, cholic, palmitic, mucic, camphoric, glutaric, glycolic, phthalic, tartaric, lauric, stearic, salicylic, 3-phenyl-salicylic, 5-phenylsalicylic, 3-methylglutaric, orthosulfobenzoic, cyclohexanesulfamic, cyclopentanepropionic, 1,2-cyclohexanedicarboxylic, 4-cyclohexenecarboxylic, octadecenylsuccinic, octenylsuccinic, methanesulfonic, benzene-sulfonic, helianthic, Reinecke's, dimethyldithiocarbamic, hexadecylsulfamic, octadecylsulfamic, sorbic, monochloroacetic, undecylenic, 4'-hydroxyazobenzene-4-sulfonic, octyldecylsulfuric, picric, benzoic, cinnamic, and like acids.

The acid-addition salts can be used for the same purposes as the free base or they can be employed to upgrade the same. For example, the free base can be converted to an insoluble salt, such as the picrate, which can be subjected to purification procedures, for example, solvent extractions and washings, chromatography, fractional liquid-liquid extractions, and crystallization and then used to regenerate the free base form by treatment with alkali or to make a different salt by metathesis. Or the free base can be converted to a water-soluble salt, such as the hydrochloride or sulfate and the aqueous solution of the salt extracted with various water-immiscible solvents before regenerating the free base form by treatment of the thus-extracted acid solution or converted to another salt by metathesis.

The free bases can be used as buffers or as antacids. They react with isocyanates to form urethanes and can be used to modify polyurethane resins. The thiocyanic acid addition salt when condensed with formaldehyde forms resinous materials useful as pickling inhibitors according to U.S. Pat. Nos. 2,425,320 and 2,606,155. The free bases also make good vehicles for toxic acids. For example, the fluosilicic acid addition salts are useful as mothproofing agents according to U.S. Pat. Nos. 1,915,334 and 2,075,359 and the hexafluoroarsenic acid and hexafluorophosphoric acid addition salts are useful as parasiticides according to U.S. Pat. Nos. 3,122,536 and 3,122,552.

The bromination is effected with bromine in an inert solvent in a manner already well known in the art. The conversion of the resulting bromide to the 1-thio-α-D-glycoside is effected by reacting the bromide with thiourea by the procedure already described, except that in this, in the reaction of the bromide with thiourea, case the acetone or other solvent is replaced by a tertiary amide dipolar aprotic solvent, for example, hexamethylphosphoric triamide, dimethylformamide, and N-methyl-pyrrolidone, in a tertiary base dipolar aprotic solvent, treating the resulting produce with water to decompose the isothiouronium salt formed, and alkylating the glycosyl mercaptan thus formed. By carrying out the reaction in a tertiary amide dipolar aprotic solvent, a substantial yield of R peracylated 6-amino-6-deoxy-1-thio-α-D-galactopyranoside is obtained. On subjecting this product to hydrazinolysis, R 6-amino-6-deoxy-1-thio-α-D-galactopyranoside is obtained. The acylation of this compound to form 7,8-bisnorlincomycin or analog thereof can be effected by processes already well known in the art. See for example U.S. Pat. No. 3,380,992. Any of the 4-substituted L-2-pyrrolidinecarboxylic acids there disclosed can be used as the acylating agent to produce 7,8-bisnorlincomycin and its analogs.

The acyl groups used to protect the sugar moiety are those commonly used in the art for this purpose. Acetyl is entirely adequate but can be substituted by other carboxacyl groups as is well known in the sugar art. Thus in place of acetyl there can be substituted other alkanoyl groups as well as benzoyl and other aralkanoyl groups. Any hydrocarbon carboxylic acid up to and including 20 carbon atoms can be used.

The invention can be more fully understood by reference to the following examples in which the solvent ratios are volume to volume and the parts are by weight, unless otherwise specified.

Example 1

Conversion of the peracylated cis-glycosyl bromide, 6-acetamido-6-deoxy-2,3,4-tri-O-acetyl-α-D-galactopyranosyl bromide to the anomeric peracylated transglycosyl bromide, 6-acetamido-6-deoxy-2,3,4-tri-O-acetyl-β-D-galactopyranosyl bromide Part A-1

Preparation of the starting compound, 6-Acetamino-6-deoxy-1,2,3,4-tetra-O-acetyl-β-D-galactopyranose

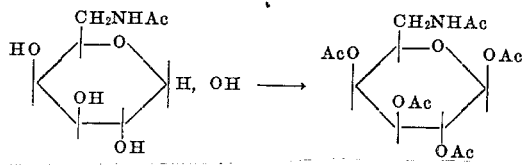

6-Acetamido-6-deoxy-1,2,3,4-tetra-O-acetyl-D-galactopyranose was obtained by acetylating the known 6-acetamido-6deoxy-α-D-galactopyranose (Szarek et al., Can. J. of Chem., 43, 2345 (1965) and Saeki et al., Annual Reports of the Sankyo Research Laboratories, 19, 137 (1967). The acetylation was effected as follows:

The unpurified acetamido sugar (from 18.0 gms. of 6-amino-6-deoxy-1,2,3,4,-di-O-isopropylidene-α-D-galactopyranoside) was dissolved in pyridine (100 cc.). acetic anhydride (50 cc.) added, the solution left overnight at room temperature, and solvent removed as completely as possible on a rotating evaporator at 40° C./high vacuum. Thin layer chromatography of the resulting brown syrup (silica gel, 1 acetone: 1 Skellysolve B) showed one spot only. The syrup was dissolved in chloroform, washed with dilute hydrochloric acid (N), water, saturated aqueous sodium bicarbonate, water, and dried over anhydrous sodium sulfate. Removal of the solvent in vacuo gave a pale yellow syrup. The syrup crystallized from ethyl acetate-Skellysolve B, (Skellysolve B is technical hexane) as colorless irregular plates of 6acetamido-6-deoxy-1,2,3,4-tetra-O-acetyl-β-D-galactopyranose, melting point 130°–131° C. and having the following properties.

Anal. Calcd. for C₁₆H₂₃O₁₀N:
C, 49.35; H, 5.95; N, 3.60%.
Found: C, 49.47; H, 6.03; N, 3.59%.

[α]_D +39° (c, 0.600, CHCl₃).

Part B-1

Conversion of 6acetamido-6deoxy-1,2,3,4-tetra-O-acetyl-β-D-galactopyranose to 6acetamido-6-deoxy-2,3,4-tri-O-acetylα-D-galactopyranosyl bromide

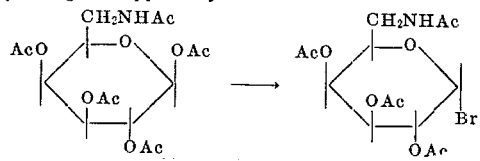

The pentaacetate of Part A-1, 8.55 gms., was treated with a solution of anhydrous hydrogen bromide in glacial acetic acid (40 ccs., saturated at 0° C.), swirled by hand until all had dissolved and then left at room temperature for 3 hours. The tan, somewhat viscous reaction solution was diluted with chloroform (200 ccs.), and poured on ice. The chloroform layer was removed, the aqueous layer extracted with chloroform, and the combined extracts washed with cold water until the washings were neutral to Congo red indicating paper. The extracts were dried over anhydrous sodium sulfate, and the solvent removed on a rotating evaporator at 40° C./7mm., to give an almost colorless syrup.

Part C-1

Conversion of 6-acetamido-6-deoxy-2,3,4-tri-O-acetyl-α-D-galactopyranosyl bromide to methyl 6-acetamido-6-deoxy-2,3,4-tri-O-acetyl-1-thio-β-D-galactopyranside.

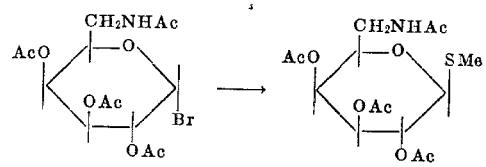

To the colorless syrup was added thiourea (5.01 gm., 3 mols.) and acetone (100 ccs.) and the mixture heated under gentle reflux on the steam-bath (Drierite tube) for 1½ hours, then left overnight at room temperature. To the reaction solution, cooled in an ice bath, was added potassium carbonate (anhydrous, 5.2 gms.), sodium bicarbonate (6.6 gms.), water (50 ccs.) and methyl iodide (10 ccs., large excess) and the mixture stirred vigorously magnetically for 2 hours.

Volatile solvent was removed on a rotating evaporator at 40° C./7mm., the aqueous residue extracted with chloroform, and the extracts washed with water and dried over anhydrous sodium sulfate. Thin layer chromatography (silica gel, 1 acetone:1 Skellysolve B) showed one zone only, of very slightly higher Rf than the starting acetate, and distinguished from it also in that it showed up rapidly on being sprayed with periodate-permanganate reagent, which does not react with the pentaacetate. Removal of the solvent gave a colorless syrup (4.67 gms.).

Crystallization occurred from ethyl acetate-Skellysolve B to give the methyl 6-acetamido-6-deoxy-2,3,4-tri-O-acetyl-1-thio-β-D-galactopyranoside as colorless prisms, m.p. 116°–117° C.

Anal. Calcd. for C₁₅H₂₃O₈NS:
C, 47.73; H, 6.14; N, 3.71; S, 8.50%.
Mol. Wt. 377.41.
Found: C, 47.56; H, 6.11; N, 3.93; S, 8.69%.

[α]_D +27° (c, 1.016, chloroform)
Mol. Wt. (Mass spec., M⁺) 377.

Part D-1

Conversion of methyl 6-acetamido-6-deoxy-2,3,4-tri-O-acetyl-1-thio-β-D-galactopyranoside to 6-acetamido-6-deoxy-2,3,4-tri-O-acetyl-β-D-galactopyranosyl bromide The β-thioglycoside of part C-1 (21.59 gms., 1 mol.) was dissolved in chloroform (200 ccs.) in a 2 l. round-bottomed flask equipped with a magnetic stirring bar, a pressure-equalized dropping funnel, and a drying tube, and a solution of bromine (14.65 gms., 4.70 ccs., 1.6 mols.) in chloroform (200 ccs.) added slowly. After an initial destruction of the color of the bromine, the solution assumed an orange-red hue. After an hour at room temperature beyond the addition, solvent was removed on a rotating evaporator at 40° C./7mm., the reddish-yellow syrupy residue redissolved in chloroform, solvent removed in vacuo, and the process repeated till the distillate was colorless.

Example 2

Following the procedure of Example 1, substituting the 6-acetamido-6-deoxy-2,3,4-tri-O-acetyl-α-D-galactopyranosyl bromide by 2,3,4,6-tetra-O-acetyl-α-D-glucopyranosyl bromide, there is obtained 2,3,4,6-tetra-O-acetyl-β-D-glucopyranosyl bromide.

Example 3

Following the procedure of Example 1, substituting the 6-acetamido-6-deoxy-2,3,4-tri-O-acetyl-α-D-galactopyranosyl bromide by 2,3,4,6-tetra-O-acetyl-α-D-xylopyranosyl bromide, there is obtained 2,3,4,6-tetra-O-acetyl-β-D-xylopyranosyl bromide.

Example 4

Following the procedure of Example 1, substituting the 6-acetamido-6-deoxy-2,3,4-tri-O-acetyl-α-D-galactopyranosyl bromide by 2,3,4,6-tetra-O-acetyl-β-D-mannopyranosyl bromide, there is obtained 2,3,4,6-tetra-O-acetyl-α-D-mannopyranosyl bromide.

Example 5

Following the procedure of Example 1, substituting the 6-acetamido-6-deoxy-2,3,4-tri-O-acetyl-α-D-galactopyranosyl bromide by 2,3,4-tri-O-acetyl-α-L-rhamnopyranosyl bromide, there is obtained 2,3,4-tri-O-acetyl-β-L-rhamnopyranosyl bromide.

Example 6

By substituting the 6-acetamido-6-deoxy-2,3,4-tri-O-acetyl-α-D-galactopyranosyl bromide of Example 1 by 2,3,4-tri-O-acetyl-α-D-ribosyl bromide, there is obtained 2,3,4-tri-O-acetyl-βD-ribosyl bromide.

The above examples illustrative of the invention with reference to the glycosyl bromides will be understood as applicable to glycosyl chlorides and glycosyl iodides as well.

Example 7

Conversion of 6-acetamido-6-deoxy-2,3,4-tri-O-acetyl-β-D-galactopyranosyl bromide to 7,8-bisnorlincomycin
Part A-7

Conversion of a peracylated trans-glycosyl halide, 6-acetamido-6-deoxy-2,3,4-tri-O-acetyl-β-D-glacto-pyranosyl bromide to a peracylated cis-thioglycoside, methyl 6-acetamido-6-deoxy-2,3,4-tri-O-acetyl-1-thio-α-D-galactopyranoside

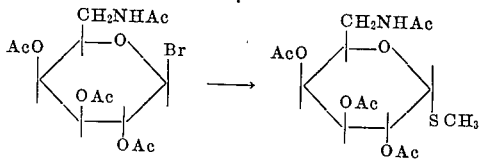

To the colorless residue of Part C-1 was added thiourea (13.1 gms., 3 mols.) and hexamethylphosphoric triamide (200 ccs.) and the mixture stirred overnight at room temperature (drying tube). The reaction mixture then was cooled in an ice-bath, potassium carbonate (anhydrous, 23.2 gms.) and sodium bisulfite (29 gms.) added, followed by water (200 ccs.) slowly, the reaction mixture tending to become warm and to effervesce. Methyl iodide (40 ccs., large excess) was then added slowly, again with effervescence, and the mixture stirred at room temperature for 3 hours.

All volatile solvent was removed on a rotating evaporator at 40° C./7mm., the residual solution dissolved in chloroform, washed twice with water, and dried over anhydrous sodium sulfate. Solvent was removed on a rotating evaporator at 40° C./7mm., and then by distillation under high vacuum from an oil-bath at 110°–120° C. The dark syrupy residue was dissolved in chloroform, washed with water, dried over anhydrous sodium sulfate, and the solvent removed at 40° C./7mm.

The crude material was divided into two (16.4 and 16.5 gms.) and chromatographed separately on silica (3,950 gms., column dimensions 10.5 × 93 cm.) in the system 1 acetone:1.5 Skellysolve B (v/v). Fractions (50 cc.) were collected automatically after a forerun of 13.5 l. Fractions nos. 351–520, inclusive, were combined and yielded methyl 6-acetamido-6-deoxy-2,3,4-tri-O-acetyl-1-thio-α-D-galactopyranoside (1.63 gms.). Fractions 581–900, inclusive, gave the β-anomer (5.67 gms.), while fractions nos. 521–580, inclusive, consisted of a mixture (1.21 gms.) of the two anomers. The second column behaved very similarly, and yielded 1.45 gms. of the α-anomer.

Fractions 521–900 were combined for recycling.

The methyl 6-acetamido-6-deoxy-2,3,4-tri-O-acetyl-1-thio-α-D-galactopyranoside obtained initially as a syrup, crystallized readily from ethyl acetate-Skellysolve B in colorless, elongated platelets, m.p. 162°–163° C.

Anal. Calcd. for C₁₅H₂₃O₈NS:
    C, 47.73; H, 6.14;    N, 3.71; S, 8.50%.
    Mol. Wt. 377.41.
Found: C, 48.06; H, 6.50;    N, 3.82; S, 8.69%.

[α]$_D$ +207° (c, 1.0006, chloroform).
Mol. Wt. (Mass spec., M⁺) 377.

Part B-7

Conversion of methyl 6-acetamido-6-deoxy-2,3,4-tri-O-acetyl-1-thio-α-D-galactopyranoside to methyl 6-amino-6-deoxy-1-thio-α-D-galactopyranoside

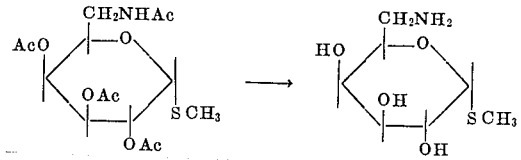

The α-thioglycoside tetracetate of Part A-7 (3.08 gms.) was heated under gentle reflux with hydrazine hydrate (100 ccs.) for 24 hours (oil-bath at 155° C.). Solvent was removed by distillation from the colorless solution as completely as possible, finally under 7 mm. pressure giving a colorless syrup, which could not be induced to crystallize. The mixture was chromatographed on silica gel in the system 1 methanol:1 chloroform (v/v) till the front-moving contaminants were removed: the column was then stripped with methanol. Solvent removal then gave methyl 6-amino-6-deoxy-1-thio-α-D-galactopyranoside as a colorless syrup (1.03 gms.).

Part C-7

Conversion of methyl 6-amino-6-deoxy-1-thio-α-D-galactopyranoside to 7,8-bisnorlincomycin Trans-1-methyl-4-propyl-L-2-pyrrolidinecarboxylic acid hydrochloride (2.03 gms., 2 mols.) was stirred in anhydrous acetonitrile (100 ccs.). On the addition of triethylamine (1.10 gms., 1.51 ccs., 2.2 mols.), all of the solid dissolved. After cooling to −5° C. in an ice-methanol bath, isobutyl chloroformate (1.36 gms., 1.29 ccs., 2 mols.) was added, and the solution stirred for 15 minutes at −5° C.

A solution of the methyl 6-amino-6-deoxy-1-thio-α-D-galacto-pyranoside (1.03 gms., 1 mol.) in water (6 ccs.) was added all at once, and stirring continued for 1 hour. Solvent was removed on a rotating evaporator at 40° C./7 mm., the syrupy residue dissolved in ethanol and the solvent removed as above to give a tan amorphous solid. This residue was dissolved in water, adjusted to pH 2 by the addition of aqueous hydrochloric acid (4N), and extracted thoroughly with chloroform. The aqueous solution was taken to pH 10 by the addition of aqueous sodium hydroxide (50 percent), and extracted thoroughly with chloroform. Removal of solvent after drying the last extract over anhydrous sodium sulfate gave 7,8-bisnorlincomycin free base as a tan amorphous solid, weight 790 mgs.

Chromatography of this product on silica gel (300 gms., column dimensions 2.8 × 96 cms., 350 cc. forerun) collecting 25 cc. fractions automatically, gave the product in fractions nos. 24–60, inclusive, wt. 235 mgms., showing one spot only on thin layer chromatography of Rf 0.33. This free base was dissolved in water by adding aqueous hydrochloric acid (N) till the resultant pH of the solution was ca. 3, filtered, and lyophilized. The colorless amorphous 7,8-bisnorlincomycin hydrochloride could not be obtained crystalline.

Anal. Calcd. for C₁₆H₃₀O₅N₂S·HCl:
    C, 48.70; H, 7.83;    N, 7.02; S, 8.04;
    Cl, 8.89%. Mol.    Wt. (Free base) 362.49.
Found: (In sample corrected    for 4.02% H₂O)
    C, 48.22; H, 7.93;    N, 6.86; S, 7.80;
    Cl, 9.08%.

$[\alpha]_D$ +125° (c, 1.0728, $H_2O$)
Mol. Wt. (Mass spec., $M^+$) 362.

I claim:

1. A process for converting peracylated cis-glycosyl halides to peracylated trans-glycosyl halides which comprises converting the peracylated cis-glycosyl halide to a peracylated alkyl or benzyl trans-1-thioglycosides by first forming a peracylated trans-glycosyl mercaptan and then alkylating or benzylating this product to form a peracylated alkyl or benzyl trans-1-thioglycoside, and reacting this peracylated trans-1-thioglycoside with bromine in an inert solvent to form the desired peracylated-trans-glycosyl halide.

2. The process of claim 1 in which the peracylated trans-glycosyl mercaptan is formed by reacting peracylated cis-glycosyl halide with
   1. potassium xanthate followed by treatment with ammonia, or
   2. potassium sulfide to form the corresponding disulfide followed by reductive cleavage of the latter by aluminum amalgan or zinc, or
   3. thiourea in an inert solvent to form the corresponding isothiouronium salt followed by decomposing this salt by means of acid sodium carbonate.

3. The process of claim 2 in which the halide is bromide.

4. The process of claim 1 in which the conversion of the peracylated cis-glycosyl halide to a peracylated trans-1-thioglycosyl halide is effected by reacting the peracylated cis-glycosyl halide with thiourea to form the corresponding isothiouronium halide, decomposing the latter to the corresponding peracylated glycosyl mercaptan and concomitantly alkylating the peracylated glycosyl mercaptan whereby to form the desired peracylated trans-1-thioglycoside.

5. The process of claim 1 in which the peracylated cis-glycosyl halide is 6-acetamido-6-deoxy-2,3,4-tri-O-acetyl-α-D-glactopyranosyl bromide.

6. The process of claim 4 in which the peracylated cis-glycosyl halide is 6-acetamido-6-deoxy-2,3,4-tri-O-acetyl-α-D-galactopyranosyl bromide.

7. A process for making alkyl 6-amino-6-deoxy-1-thio-α-D-galactopyranoside which comprises
   1. acylating 6-acylamino-6-deoxy-D-galactopyranose to form 6-acylamino-6-deoxy-1,2,3,4-tetra-O-acyl-D-galactopyranose,
   2. converting the latter to the corresponding glycosyl halide, 6-acylamino-6-deoxy-2,3,4-tri-O-acyl-α-D-galactopyranosyl halide,
   3. converting the latter to the corresponding trans-1-thioglycoside,
   4. reacting the latter with halogen in an inert solvent to form the corresponding trans-glycosyl halide,
   5. converting the latter to the corresponding alkyl cis-1-thioglycoside,
   6. deacylating the latter to form the desired alkyl 6-amino-α-D-galactopyranoside.

8. The process of claim 7 in which steps 3 and 4 are effected by reacting the glycosyl halide with thiourea to form the corresponding isothiouronium halide and decomposing the latter to the corresponding peracylated glycosyl mercaptan and concomitantly alkylating the peracylated glycosyl mercaptan to form the desired peracylated trans-1-thioglycoside.

9. The process of claim 8 in which the halide is bromide.

10. A compound of the formula

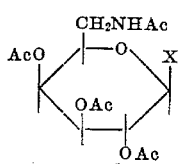

wherein X is bromine and Ac is the acyl of a hydrocarbon carboxylic acid up to and including 20 carbon atoms.

11. The compound of claim 10 wherein X is bromine and Ac is acetyl.

12. A process for converting peracylated cis-glycosyl bromides to peracylated trans-glycosyl bromides which comprises converting the starting compound to a peracylated glycosyl mercaptan by reaction with
   1. potassium xanthate followed by treatment with ammonia, or
   2. potassium sulfide to form the corresponding disulfide followed by reductive cleavage of the latter by aluminum amalgan or zinc, or
   3. thiourea in an inert solvent to form the corresponding isothiouronium salt followed by decomposing this salt by means of acid sodium carbonate, methylating this peracylated trans-glycosyl mercaptan with methyl iodide to form a peracylated methyl trans-1-thioglycoside, and reacting this compound with bromine in an inert solvent to form the desired peracylated trans-glycosyl bromide.

13. A compound of the formula

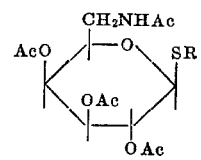

wherein Ac is the acyl of a hydrocarbon carboxylic acid up to and including 20 carbon atoms and R is lower alkyl.

14. The compound of claim 13 in which R is methyl.

15. The compound of claim 13 wherein R is methyl and Ac is acetyl.

16. A compound of the formula

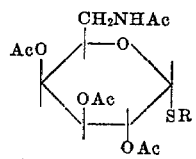

wherein Ac is hydrogen, the acyl of a hydrocarbon carboxylic acid up to and including 20 carbon atoms and R is lower alkyl.

17. The compound of claim 16 in which R is methyl.

18. The compound of claim 16 wherein Ac is acetyl and R is methyl.

19. The compound of claim 16 wherein Ac is hydrogen and R is methyl.

20. A compound of the formula

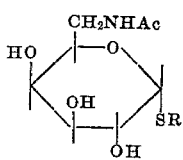

or an acid addition salt thereof wherein R is lower alkyl and Ac is the acyl of an L-2-pyrrolidinecarboxylic acid.

21. The compound of claim 20 in which R is methyl.

22. The compound of claim 20 or an acid addition salt thereof in which R is methyl and Ac is 1-methyl-4-trans-propyl-L-2-pyrrolidinecarboxacyl.

* * * * *